Oct. 2, 1923.
W. WARE
ROLLER
Filed Nov. 20, 1922
1,469,344
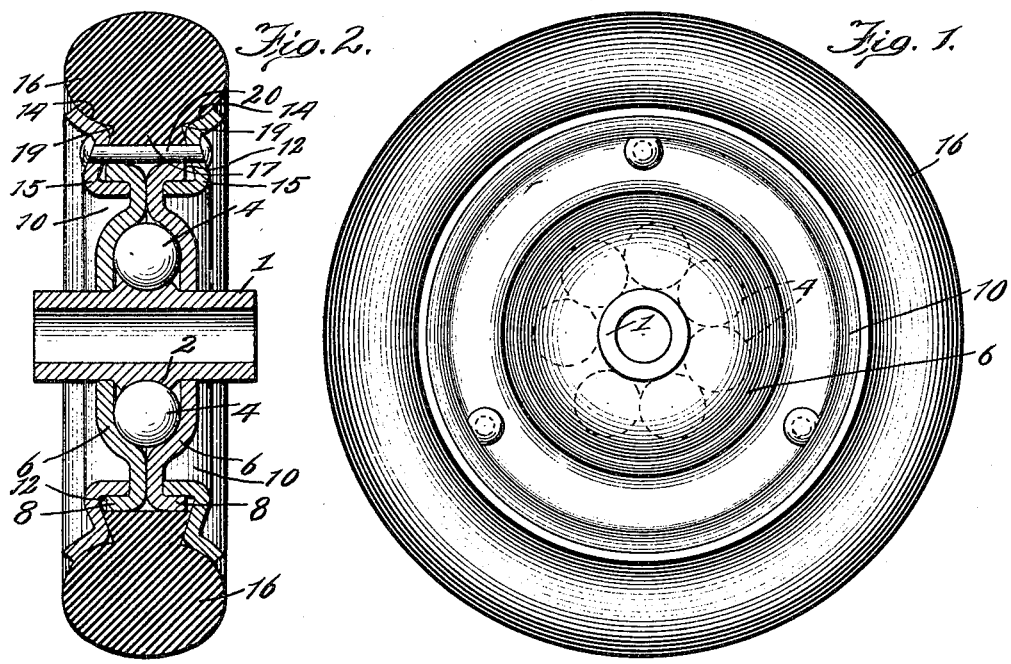
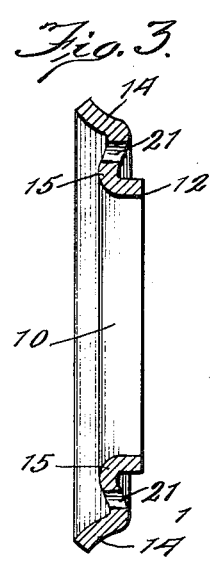
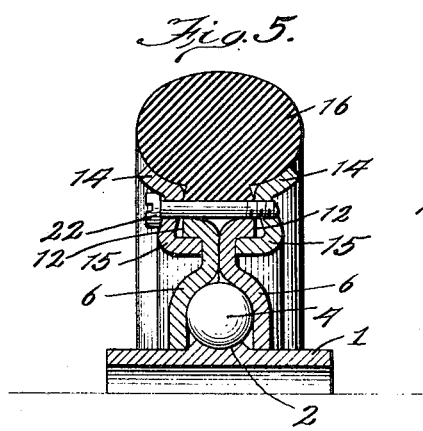
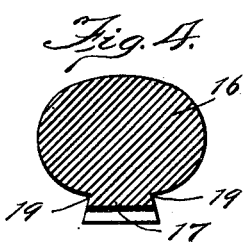
Inventor:
Walter Ware
By Cheever & Cox
Attys Patented Oct. 2, 1923.

1,469,344

UNITED STATES PATENT OFFICE.

WALTER WARE, OF CHICAGO, ILLINOIS.

ROLLER.

Application filed November 20, 1922. Serial No. 601,961.

*To all whom it may concern:*

Be it known that I, WALTER WARE, a citizen of the United States, residing at Chicago, in the county of Cook and State of Illinois, have invented a certain new and useful Improvement in Rollers, of which the following is a specification.

My invention relates to rollers for roller skates and the like, and the objects of the invention are to provide a built-up structure which is equipped with a resilient tire, may be readily assembled, is composed of simple parts, few in number, and is capable of remaining rigidly unitary when in service.

I accomplish these objects by the construction illustrated in the accompanying drawings, in which—

Figure 1 is a side view of the complete roller.

Figure 2 is a diametral section thereof.

Figure 3 is a diametral sectional view of one of the clamping rings.

Figure 4 shows the outline of the tread of the tire in cross section, and

Figure 5 is a section similar to Figure 2 but showing a different type of tie member.

Like numerals denote like parts throughout the several views.

Referring first to the type shown in Figures 1 and 2 wherein the parts are permanently assembled, the hub 1 has an external ball race 2 for the anti-friction balls 4. On either side of the balls are bushings 6 which are arched so as to bear upon them. These bushings are symmetrical in design but constructed "rights" and "lefts". Each has a marginal flange 8 bending outward, by preference approximately at right angles to the plane of the roller. These flanges are engaged by rings 10, which are alike except that they too are formed "rights" and "lefts". Each ring has an inner flange 12 which projects inward and abuts the outer surface of the adjacent bushing and engages the inner surface of flange 8. Each ring also has an outer flange 14 which abuts the body of the tire 16 for transmitting to it a portion of the load which the roller is carrying. Each ring also has an intermediate portion 15 which connects flanges 12 and 14.

Viewed in cross section the tire has an elliptical or otherwise rounded body portion 16 and an inner flange 17. By preference the sides of the tire are recessed at 19 which gives the flange 17 a more or less dovetail appearance. The intermediate portion 15 of the ring engages the side of the flange 17, and the outer flange 14 of the ring bears against the body portion of the tire and transmits to it a considerable portion of the weight of the load. The flanges 8 of the bushings rest upon the inner cylindrical surface of the flange 17 and thus serve to transmit the remaining portion of the load. Thus it may be said that the tire seats partly on the flanges 14 of the clamping rings and partly on the flanges 8 of the bushings. While the shape of the tire and of the clamping rings 10 may be somewhat varied in cross section, the illustrated construction is a good one and it will be observed that the rings are slightly wedge shaped so as to fit snugly into the recesses 19 formed at the sides of the tire.

The parts are held assembled by tie elements which in Figure 2 are shown to be rivets 20. These pass through apertures 21 in the rings 10 and permanently hold them in position. It will be evident that when the heads of these rivets are so formed as to draw the rings closely together they will clamp the bushings 6 in close contact with each other. In some cases it is desirable not to have the parts permanently assembled and therefore I have shown in Figure 5 a machine screw 22 which is adapted to hold the clamping rings assembled as in the previous case, but may be removed in case it is desired to insert a new tire or to make other repairs or renewals.

The construction illustrated is simple and highly efficient. The principal members are only five in number, that is, the hub, the two bushings and the two clamping rings. Furthermore the shape of the parts is simple and when they are properly assembled their structure will possess great strength and will avoid any danger of play between the parts. It will be noted that the bushings and clamping rings have interfitting flanges and that the flanges of the rings serve to hold the bushings in close contact with each other. The parts are symmetrical with respect to a median plane transverse to the axis and the parts may be readily assembled—an important consideration from the standpoint of cost of production.

Having thus described my invention what I claim as new and desire to secure by Letters Patent is:

1. A roller having a resilient tire having a central inner flange, centrally apertured bushings forming the web of the roller, a pair of rings adapted to clamp the bushings together and to engage the sides of the tire flange for holding it in position, and means for securing the rings in clamping position.

2. A roller having a resilient tire with an annular flange projecting inward, a central hub, a pair of bushings supported upon the hub, a pair of rings on opposite sides of the bushings for clamping them together, said rings engaging the sides of the tire flange and the adjacent portions of the body of the tire for transmitting to it a portion of the load.

3. A roller having a resilient tire, a pair of plates provided with means for carrying the load, and clamping members engaging the tire and having flanges for pressing said plates toward each other for holding the parts assembled.

4. A roller having a resilient tire, a pair of plates provided with means for carrying the load, said plates having peripheral flanges projecting laterally outward, clamping rings having flanges engaging the flanges of the plates for holding the parts together, said rings also engaging the tire, and bolts for holding the clamping rings in position.

5. A roller having a resilient tire, a hub, a pair of plates in which the hub is mounted, said plates having flanges projecting laterally outward, clamping rings having flanges projecting laterally inward for pressing said plates towards each other, the flanges on the rings engaging the flanges of said plates, said rings also seating upon the inner surface of the tire, and means for drawing the clamping rings toward each other.

6. A roller having a resilient tire with an annular flange projecting inward, a hub, a pair of bushings in which the hub is mounted, said bushings having flanges projecting laterally outward and clamping rings adapted to be secured together and having flanges cooperating with the flanges on the bushings, said rings contacting the sides of the tire flange for preventing lateral displacement, said rings seating upon the inner annular surface of the tire whereby the downward pressure of said rings, due to the load, is transmitted to the tire.

7. A roller having a resilient tire with an annular flange projecting inward, a hub, a pair of bushings in which the hub is mounted, said bushings having flanges projecting laterally outward, clamping rings having flanges cooperating with the flanges on the bushings, said rings contacting the sides of the tire flange, and also the inner annular surface of the tire, and the flanges on said bushings engaging the inner annular surface of said tire flange, and bolts for securing the clamping rings.

8. A roller having a hub, an annular ball race, balls in said race, a pair of internally dished bushings bearing upon said balls, a pair of clamping rings pressing said bushings together and interlocking with said bushings for preventing relative movement in a plane transverse to the axis, and a resilient tire engaged by said rings to be held in position thereby.

In witness whereof, I have hereunto subscribed my name.

WALTER WARE.